Sept. 20, 1971 A. MIEVILLE 3,606,024
MULTIPURPOSE STRUCTURE IN STANDARDIZED ELEMENTS
Filed June 2, 1969 7 Sheets-Sheet 1

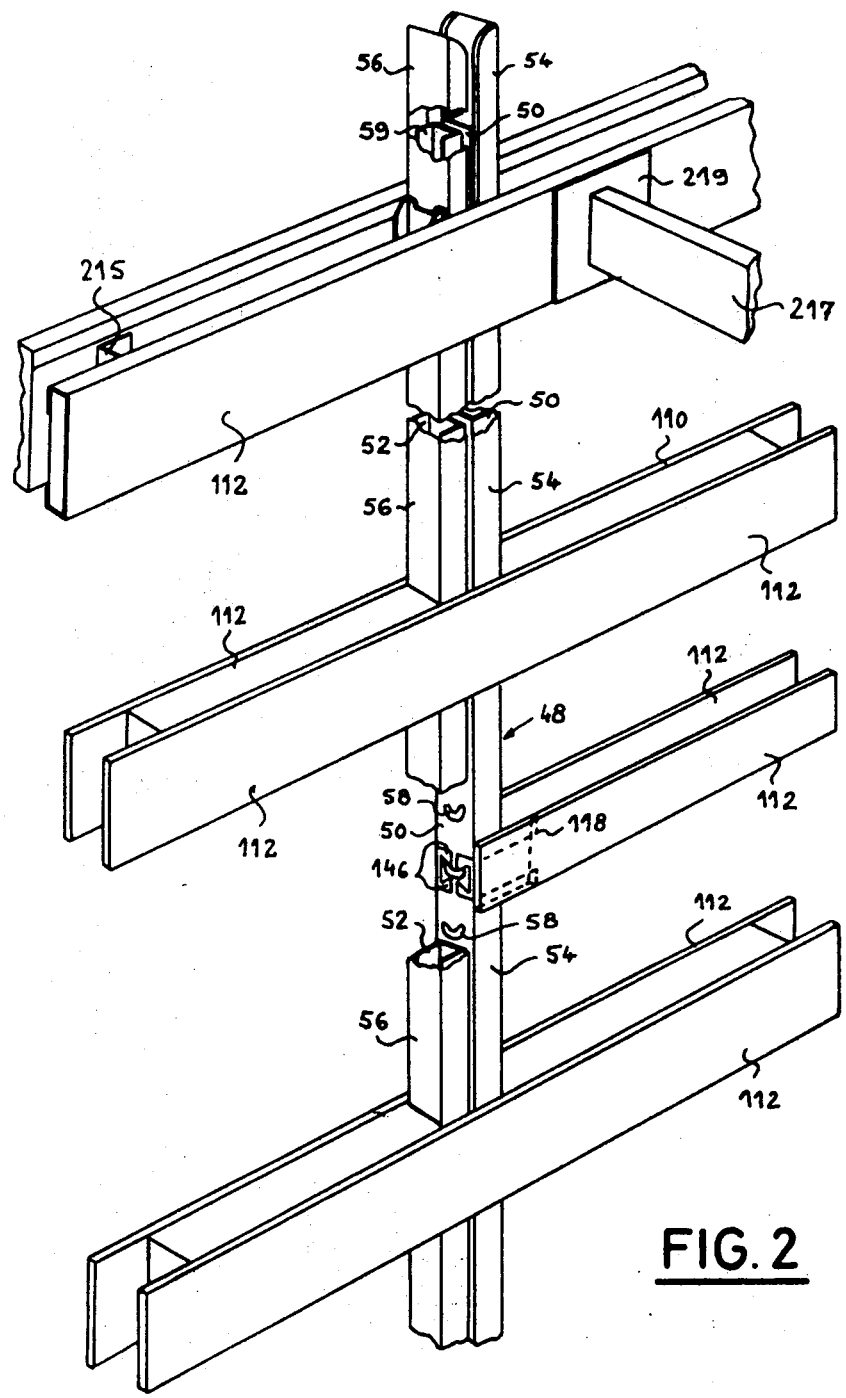

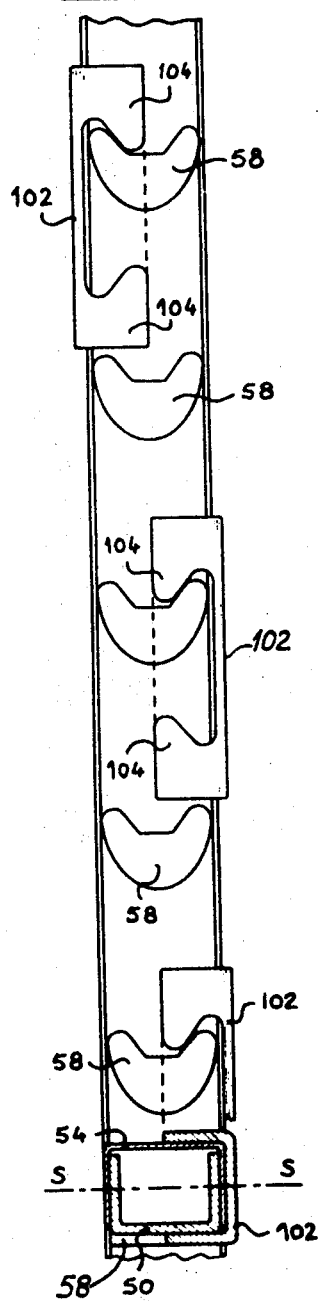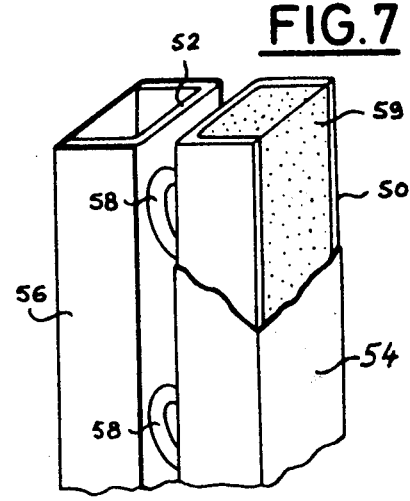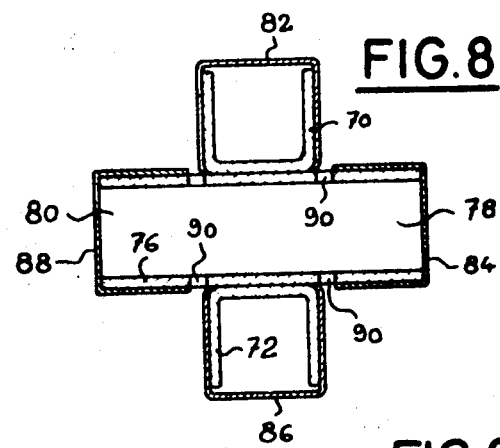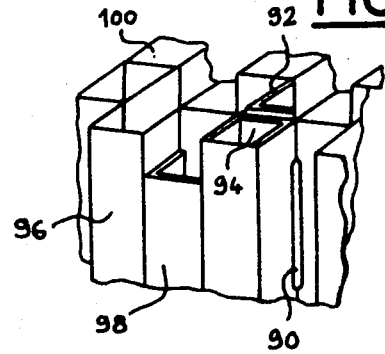

Sept. 20, 1971 A. MIEVILLE 3,606,024
MULTIPURPOSE STRUCTURE IN STANDARDIZED ELEMENTS
Filed June 2, 1969 7 Sheets-Sheet 5

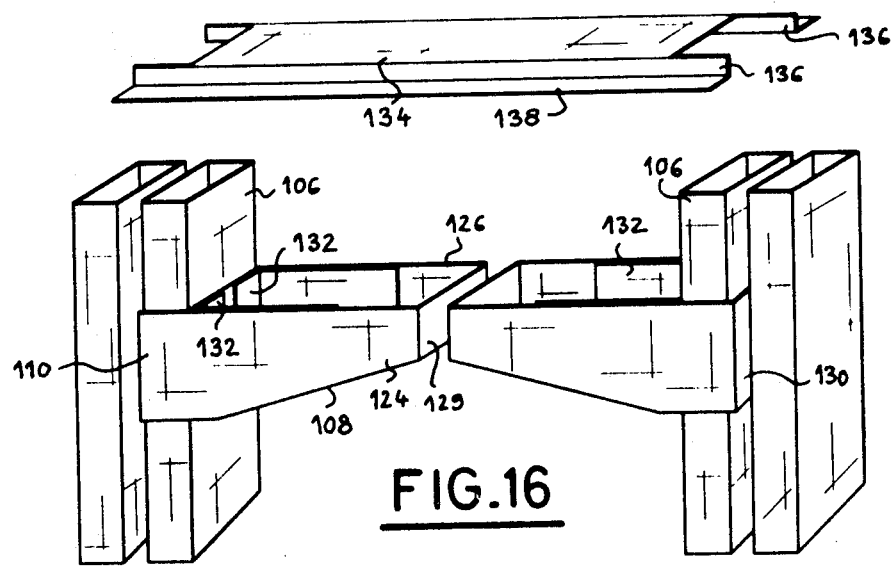
FIG.16
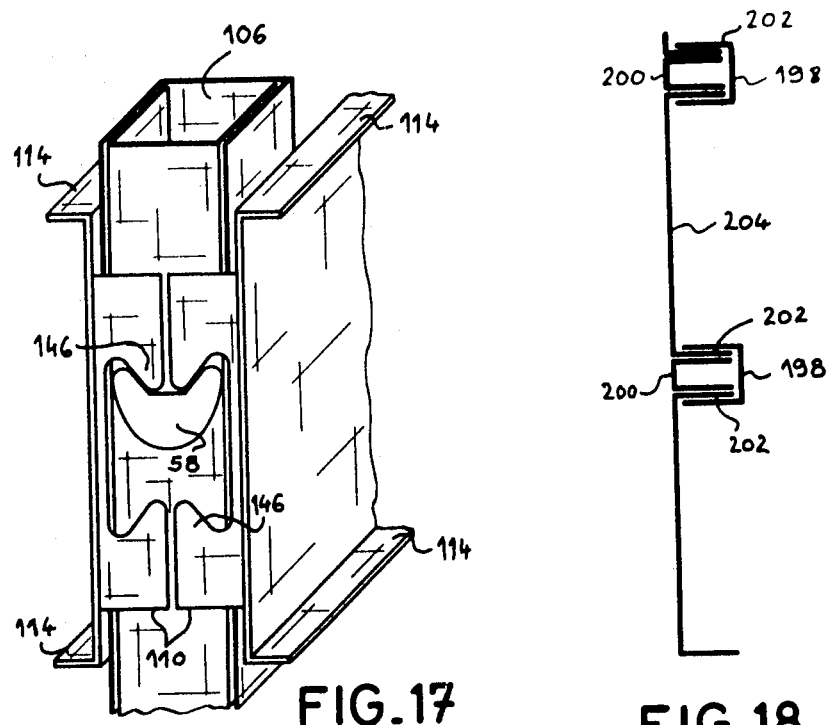
FIG.17
FIG.18

United States Patent Office 3,606,024
Patented Sept. 20, 1971

3,606,024
MULTIPURPOSE STRUCTURE IN STANDARDIZED ELEMENTS
André Mieville, Lausanne, Switzerland, assignor to SA pour l'Etude de la Promotion des Entreprises, Fribourg, Switzerland
Filed June 2, 1969, Ser. No. 829,343
Claims priority, application Switzerland, May 31, 1968, 8,146/68
Int. Cl. A47f 5/10
U.S. Cl. 211—176   23 Claims

ABSTRACT OF THE DISCLOSURE

A structure in standardized elements, for example forming a piece of furniture, comprises a framework of parallel longitudinal sectioned elements assembled by means of transverse elements. Each longitudinal element comprises at least two hollow open sections which interfit by elastic gripping in a manner to define a generally prismatic longitudinally enclosed enclosure and the transverse elements are fitted to the longitudinal elements by the gripping of the two interfitting sections. The sections of the longitudinal element can be of U-shaped cross section and have an exterior surface of plastics material to increase the gripping effect thereof.

The invention relates to a structure in standardized elements comprising a framework of parallel longitudinal sectioned elements assembled by means of transversal elements. The structure according to the invention enables the provision of elements which can for example have an application in the building industry. It principally concerns metallic furnishing elements such as office furniture, shelving, libraries, tables, store cases, racks, etc. Another application of the invention is for partitions, walls, false ceilings, or other elements having a flat surface.

The aim of the invention is to provide a multipurpose structure enabling an easy assembly which can be provided on the spot without having to rely on welding, screwing or other securing processes which require special tools and/or specialized workers.

The invention enables provision of an infinite number of combinations which enable the user to change the arrangement of the furnishing element, for example by varying the horizontal spaces between the up-rights and vertical spacing between the transversal elements which can be shelves, drawers, or other stockage devices.

The invention uses simple sectioned elements of low cost price and which do not have to be perforated to enable the assembly, this taking place generally by gripping of the transversal elements on the longitudinal elements, such as up-rights. The sections used can be relatively thin sections, the rigidity of the assembled structure resulting from the special assembly proposed by the invention. The relatively thin sections used preferably undergo a pressing operation enabling the sections to be provided with embossments or other protuberances facilitating securing of the transversal elements.

The invention also enables a particularly striking aesthetic aspect to be achieved whilst at the same time the assembly of simple elements gives an extremely economical result and the simple and rapid assembly can be carried out by non-specialist workers or even by the user.

The structure according to the invention is characterised by the fact that each longitudinal element comprises at least two hollow open sections interfitting by elastic gripping in a manner to define a generally prismatic longitudinally enclosed enclosure, the transversal elements being fixed to the longitudinal elements by gripping of the two interfitting sections.

These interfitting sections are preferably metallic and have a substantially U-shaped transversel cross-section. The exterior surface of the exterior section receiving the interior section is preferably provided with a layer of plastic material increasing the adhesion to this surface. Possibly the exterior section can be entirely composed of plastics material.

One embodiment of the invention consists of a partition characterised by the fact that the said transversal elements are formed from a planar sheet with edges bent at right angles, the edges being engaged by elastic gripping between the wings of the interfitting sections.

It is thus possible to provide a false ceiling or a removable wall or partition of which the dimensions can be changed at will.

Another embodiment of the invention consists of a furniture element characterised by the fact that each longitudinal element is constituted by two U-shaped sections stuck together back-to-back with a narrow interstice and with the interposition of spacing parts between their backs.

Preferably the said spacing parts consists of embossments provided on the backs of at least one of these stuck sections. These embossments enable the securing of the transversal elements on up-rights as will be later described.

Other characteristics and advantages of the invention will be seen from the following description which refers to the accompanying drawings on which are shown several embodiments of the invention, given by way of non-limiting example.

In the accompanying drawings:

FIG. 1 shows a partial perspective view of shelving according to the invention.

FIG. 2 also shows in perspective a detail of the assembly of the longitudinal and transversal elements.

FIG. 6 shows a rear view of an up-right comprising a section provided with protuberances by pressing and provided with grippers maintaining the interfitting sections in assembly position. The lower part of the figure shows a cross-section along line VI—VI.

FIG. 7 shows the upper part in perspective of an up-right composed of a twinning of two sections disposed back-to-back.

FIG. 8 shows a transversal cross-section of a multiple longitudinal element comprising four edges.

FIG. 9 shows a partial perspective view of the upper part of a structure according to the invention having a crenelled exterior surface.

FIG. 16 is a perspective view of two double up-rights embraced by support grippers covered by a common cover on which transversal elements can take support.

FIG. 17 is a perspective view of an assembly of two supports embracing an up-right on which they are secured by hooking.

FIG. 18 shows the assembly of a partition according to the invention in transversal cross-sectional view.

Figure 1:
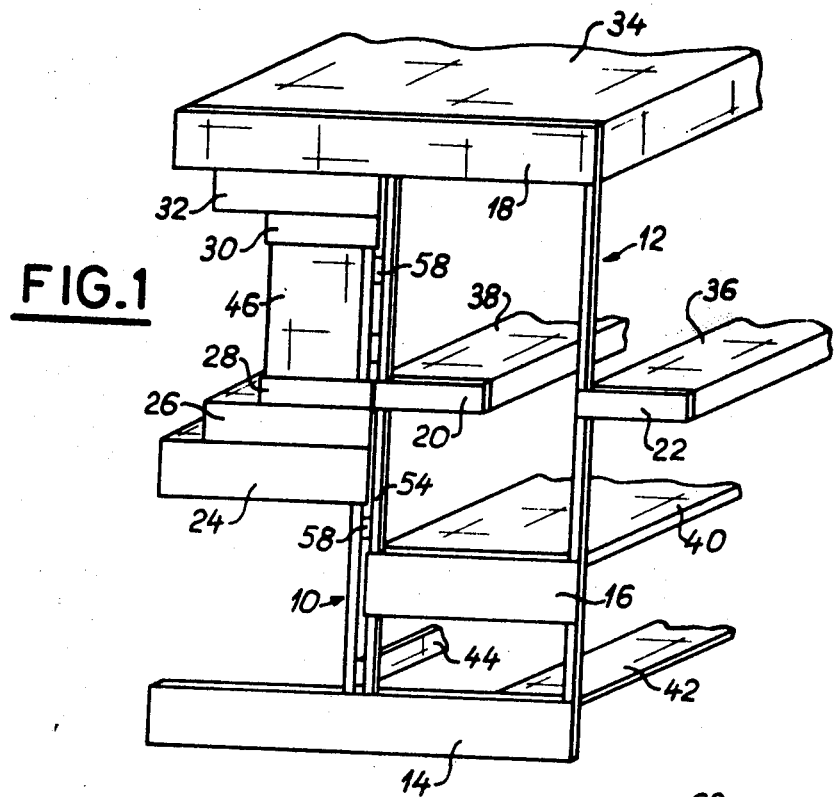

There is seen on FIG. 1 the rear lateral part of a piece of furniture according to the invention. This part comprises two up-rights 10 and 12 joined by cross-bars 14, 16 and 18. Arms 20, 22, 24, 26, 28, 30 and 32 are secured on up-rights 10 and 12 and enable with the cross-beams 14, 16 and 18 the fixing of horizontal shelves 34, 36, 38, 40 and 42 constituting stockage shelving. There is seen at 44 another transversal element coming to join another up-right not shown on figure and it will be understood that the assembly can extend in all directions. A vertical partition 46 has been inserted between the arms 28 and 30, which are double, for ornamental purposes or to support objects placed on the shelves, such as books or files. Of course, the piece of furniture can have any purpose whatsoever, and serve for example as office furniture, for stockage, presentation, or in the kitchen without this list be limiting. In the latter case it is possible to incorporate kitchen furniture elements such as a refrigerator cabinet in the installation.

Figure 3:
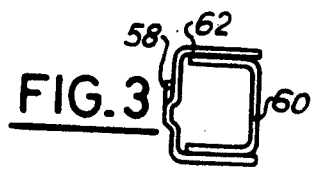
FIG. 3 is a view from above a longitudinal element or up-right composed of two inter-engaged U-shaped sections.

Referring now to FIG. 2 which shows the assembly of transversal element on longitudinal elements and which additionally shows a possibility for vertical extension of the installation. The up-rights 48 of the installation which can correspond to the up-right 10 of FIG. 1 is constituted essentially by two U-shaped sections 50 and 52 stuck together back-to-back covered by two other U-shaped sections 54 and 56 respectively. The interior sections 50 and 52 are metallic and relatively thin so that it is possible to make them undergo a pressing operation with a view to obtain exterior embossments on their backs. These embossments are constituted by heart-shaped protuberances 58 (see also FIG. 6). These embossments 58 are distributed at regular intervals over all the length of the back of the sections 50 and 52 and have flat surfaces enabling the fixation of two sections 50, 52 back-to-back, for example by welding the flat surfaces of these protuberances. In this manner the heart-shaped embossments 58 also constitute spacing parts provided with a small interstice, for example of the order of several millimetres, between the backs of the interior sections. It is clear that these protuberances 58 can have a different shape for example round or rectangular. The heart-shapes shown on the drawings have the advantage of having as a separate part two V-shaped ramps facilitating the hooking and the immobilisation of the cross-beams and grippers which will be described in full detail later on. Evidently the embossment 58 can be provided on the back of only one of the sections 50, 52. The exterior sections 54 and 56 can also be metallic and are preferably thinner than the interior sections 50 and 52, it being arranged in a manner such that the exterior sections 54, 56 can cover the sections 50 and 52 by elastic gripping, the means of the exterior sections 54, 56 being slightly separated when they are laterally interfitted on the interior sections. The exterior surface of the exterior sections 54 and 56 can be lacquered or treated in another manner to improve the aesthetic aspect. The invention notably previews the covering of the exterior sections with a layer of coloured plastics material but it is clear that the exterior section can be provided entirely in plastics material. To increase the fixation of the grippers or supports of the cross-beams, there can advantageously be provided an exterior surface more or less rough and/or deformable having a better adhesion. Additionally, the longitudinal extremities of the wings of the exterior sections 54, 56, which will hereinafter be called "sheaths," are usefully slightly curved toward the interior in a manner to enable a type of locking of the sheaths on the interior sections. The interior of the sections constitutes a longitudinal prismatic conduit of rectangular cross-section in which can be placed various equipment, such as cabling or piping. These longitudinal cavities can also contain a solid matter increasing the rigidity of the up-rights. This filling which can be seen on 59 on FIG. 7 can be in wood, plastics material or in another reinforcing or fluidtight material. Additionally, it is clear that the elements stuck together back-to-back can be exterior sections receiving other interior sections. This embodiment is shown in FIG. 3 where a U-shaped interior section 60 interfits at the interior of an exterior section 62 intended possibly to be fixed by its back to the back of another twinned section.

Figure 4:
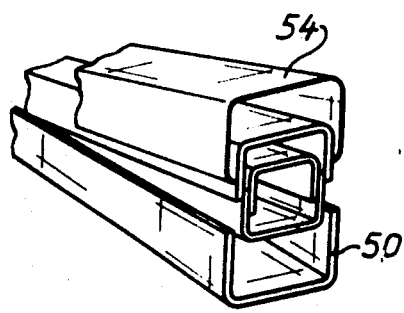
FIG. 4 is an exploded perspective view of a longitudinal element composed of five interfitting U-shaped sections.
Figure 5:
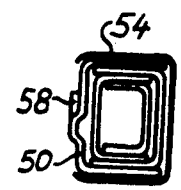
FIG. 5 is a planned view of the element of FIG. 4 in assembly position.

Preferably, twinned up-rights such as 10 and 48 are used in a part of the installation in which the transversal elements extend on either side of the twinned up-right. At the extremities, on the other hand, or at other positions of the installation where a lesser rigidity is not important, simple up-rights each constituted of an assembly of two interfitting U-shaped sections can be usefully employed. It is also possible to increase the rigidity of the single or twinned up-right by providing more than two U-shaped sections housed by their wings as shown in FIGS. 4 and 5. In the case shown, an exterior sheath 54 successively surrounds an opposed U-section 50, a U-section of the same orientation 64, an opposed U-section 66 and a U-section in the same direction 68. All of these sections are dimensioned in a manner so as to elastically grip when the exterior sheath 54 is positioned therearound and preferably has, as indicated above, slightly curved over extremities as can be seen in FIGS. 4 and 5.

In the place of simple or double up-rights shown on FIGS. 1, 2 and 7, it is possible to provide up-rights comprising a greater number of edges. An embodiment comprsing four edges is shown in FIG. 8. On this figure, two U-shaped sections 70 and 72 are welded by their backs onto two plates 74 and 76 the extremities of which form two other edges at 78 and 80. The four edges are covered by sheaths 82, 84, 86, and 88 and each edge can be provided with the support of cross-beams, these latter for example being engageable in holes or apertures 90 provided in the plates 74 and 76. It is possible to prolong this plate in a manner to constitute longer or shorter wings enabling the fixation of a desired number of edges or up-rights. It is also possible to secure, for example by welding, several wings together, these latter can enclose appropriate angles, for example right-angles. Additionally, sheaths 82, 84, 86, and 88 can be solid and include a desired number of edges. Such an embodiment is shown in FIG. 9 where there can be seen two U-shaped sections 92 and 94 twinned back-to-back and covered by a surface of plastics material 96 having longitudinal crenels.

The grooves of the creneled surface constituted by the exterior sheath which will preferably be composed of plastics material can be furnished with sections 98 the role of which can be mechanical but which have principally an aesthetic function. Another creneled surface 100 can extend at 90° from the surface 96 in a manner to constitute an assembly having special mechanical and aesthetic characteristics. To enable a possible later extension of the piece of furniture, it is possible to provide the extremities of uprights in which the exterior sheaths are longer than the interior sections. Such a version is shown in the upper part of FIG. 2 where the upper extremities of the wings of the exterior sheaths 54 and 56 have been rounded in a manner to allow the introduction of another portion of the upright.

To maintain each upright in assembly position, metallic grippers which interfit laterally on the uprights and embrace them on three sides are used. The grippers are dimensioned in a manner to elastically grip the upright by applying on the back of the embedded sections as can be seen on FIG. 6. In the case of twinned uprights, the grippers 102 preferably have on one of their wings which espouses the back of the pressed section a dove-tail notch having two noses 104 capable of lodging in the V-shaped depression of the embossment 58. The symmetrical disposition of the noses 104 enables the utilisation of each gripper 102 at will either on the left or on the right. Each gripper 102 thus constitutes a rider mounting on the lateral portion of each upright or semi-upright respectively preventing the embedded section from disengaging. The grippers can be placed on uprights facing one another or they can be alternately placed to the left or to the right as shown in FIG. 6. The wing opposing the gripper to the notched wing and which is not visible on FIG. 6 can take the shape of a small full tongue or can be identical to the notched wing visible on FIG. 6. The presence of the grippers which have just been described becomes superfluous at the position where the arms or the cross beams are secured on the uprights, the supports of the cross beams in these cases being united with the gripper as will now be described.

On FIGS. 10 to 20 the uprights have been throughout designated by the numeral 106, without regard to the particular form of the upright as hereinabove described. Each support comprises a portion 108 intended to receive or to support a transversal element and a second portion 110 intended to be secured on the upright 106. In the examples shown on the various figures, the cross beams 112 have a flat shape and are constituted by a sheath for example in plastics material with doubly bent over edges at right angles. It is clear that these cross beams can take another shape or another constitution according to the requirements. Thus they could be solid or metallic. They can also be composed of interfitting sections in the same manner as the uprights.

They ensure the transverse stability of the structure but are not indispensable for example in the case where shelves assure this role of stability. The portions 108 of the supports have small wings 114 bent at right angles (see FIG. 17) and constituting clips co-operating with the edges of the cross beams. The small wings 114 can also be doubly bent over at right angles as shown at 118 on FIGS. 2, 12, 14, 15, 19 and 20. These clips 114 and 118 can embrace the cross beams 112 but are preferably embraced by these latter, notably for aesthetic reasons. It is useful to provide presswork 120 in the edges of the portion 108 of the supports (see FIG. 12) which co-operate with analogous presswork 122 on the small wings of the cross beams 112. It is thus possible to provide a sort of lock by clipping the cross beams in their supports.

The portion 110 of the support is necessarily longitudinally open in a manner to be able to laterally interfit on the uprights 106, the two parts thus created being either elastically fixed on the part 108 (see FIG. 16), articulated one on the other (see FIG. 15) or be completely independent. In this latter case the two parts preferably have in their portion 110 hooks enabling the hooking of one part on the other (see FIG. 12). The supports of FIG. 16 are constituted by a bent metallic sheet having two parallel sides 124 and 126 united elastically by a strut 129. The portion 110 of each support has away from the upright 106 a jaw which espouses the upright over three faces. For this purpose, the extremity of each side 124 and 126 is bent over at right angles at 130 to be engaged behind the corresponding upright. Feet 132 bent over at right angles have been welded on to the interior surface of the side so that each upright is imprisoned between the jaws of the support; it is sufficient to separate the said jaws of the sides 124 and 126 to be able to pass the jaws about the upright and the supports are thus locked in this position by positioning a cover 134 which can be common to twin supports as shown on FIG. 16. The edges 135, bent over at right angles, of the cover 134 cover the upper part of the sides 124, 126 whilst the horizontal part 138 of the edges enables for example the positioning of a horizontal shelf of shelving. In the case where the structure is only slightly acted upon, the adhesion given by the exterior surface of the uprights 106 is sufficient in combination with an appropriate gripping force of the jaws to avoid a sliding of the supports along these uprights. When the load is greater the uprights will be provided with embossments constituting abutments co-operating with the jaws.

Figure 12:
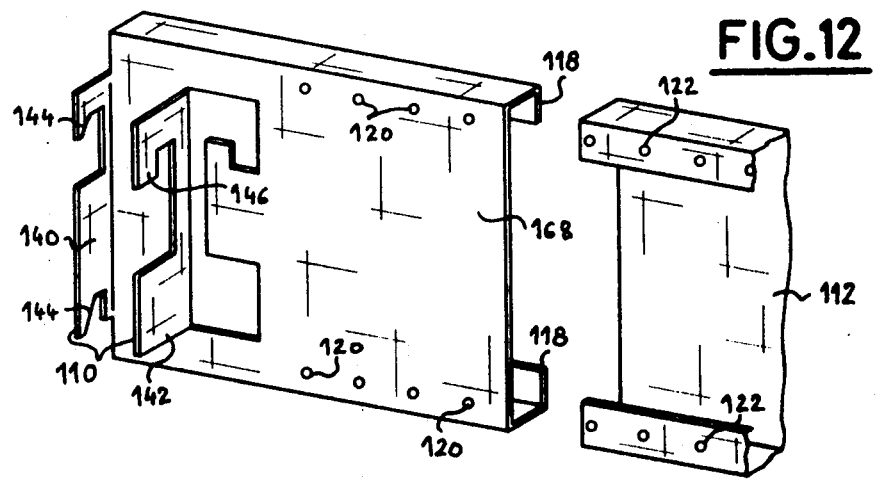
FIG. 12 is a perspective view of a support enabling the securing of a transversal element on a longitudinal element.

The half-supports shown in FIG. 12 comprise two tongues 140, 142 cut in the sheet of the half-support and then bent over at right angles; the tongue 140 is smaller than the tongue 142 and has two hooks 144 whilst the tongue 142 has a single hook 146. The counter-part of the half-support which has not been shown on FIG. 12 is practically symmetrical and comprises one tongue 140 identical to the tongue 140 which is visible on FIG. 12. The tongue 142 of the counter-part also has a hook but the shape of this hook is complementary to that of the hook visible on the figure. In this manner when the two half-supports come to embrace an upright 106, the tongues 104 of the two parts lodge in embossments 58 of the back of the upright whilst the tongues 142, whilst applying on the opposed face of the upright, are hooked one in the other by a relative vertical movement of the two half-supports. It is clear that the shape of the hooks and the tongues can be modified in various manners, the tongues 140 can for example take the shape shown at 146 on FIG. 17 and which is analogous to that of the half-rings shown on FIG. 6.

Figure 13:
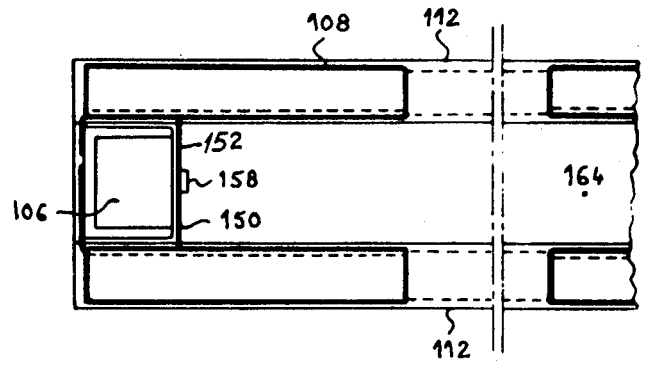
FIG. 13 is a planned view of an assembly of two continuous transversal elements attached to a twinned up-right.
Figure 14:
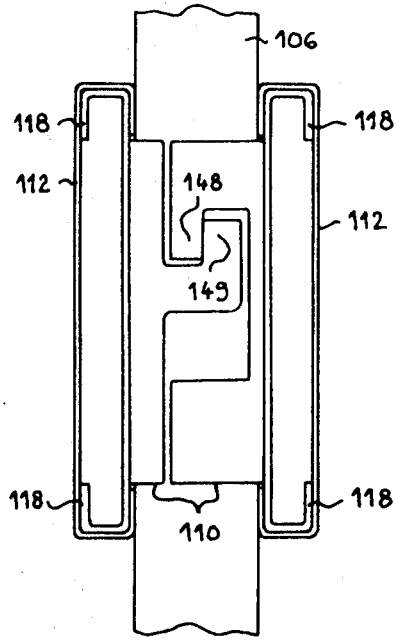
FIG. 14 shows on a larger scale a view from the left of the assembly of FIG. 13.
Figure 15:
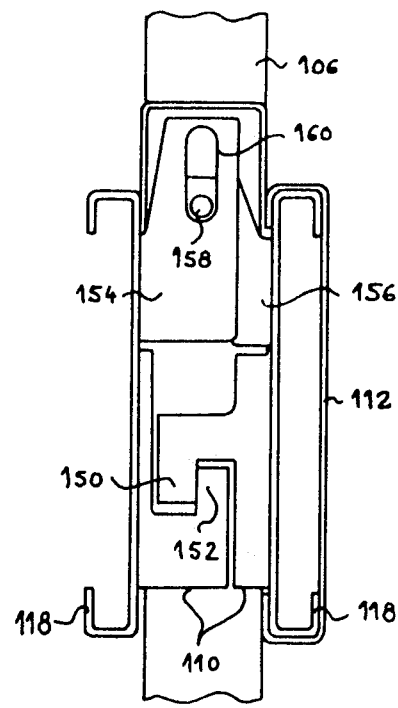
FIG. 15 shows a view from the right of the device of FIG. 13, also on a larger scale, the left-hand transversal element having been removed, the interstices between the transversal elements being covered by a sheath.

In another embodiment shown in FIGS. 13, 14 and 15, the two half-supports have separately from the upright 106 hooks 148, 149 and 150 and 152 respectively interpenetrating to join the two half-supports whilst gripping the upright 106 on its four faces. The two half-supports have two tongues 154 and 156 which can be located substantially in the plane of the hooks 150 and 142 to be articulated together by means of an axle 158 stressed in an aperture 160 of the tongue 154. The aperture 160 enables the two half-supports to effect a relative hooking movement and can also play a role in the case where the cross beams are heavily loaded to increase the gripping of the half supports on the uprights 106.

Figure 19:
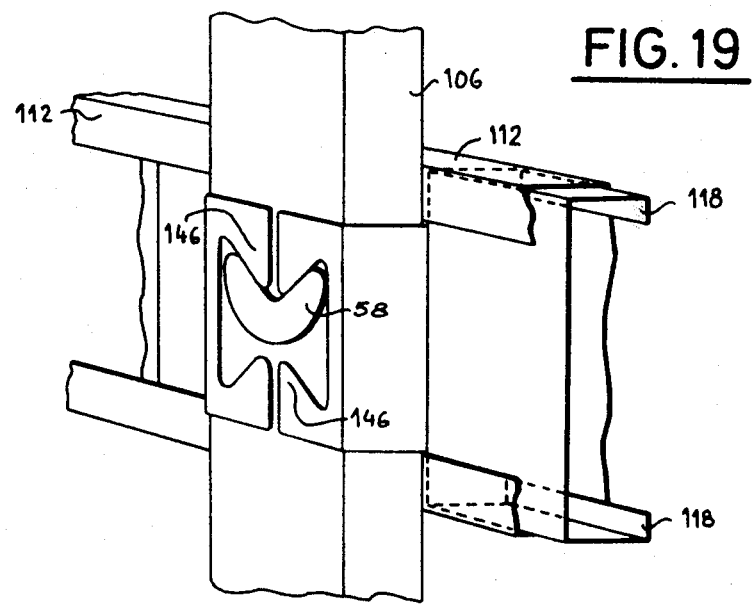
FIG. 19 is a perspective view showing another mode of assembly of transversal elements on an up-right.

FIG. 19 shows in perspective the fixing of a cross beam 112 which is applied against the face of the upright 106 opposed to the rear face comprising embossments 58. In this example, the plane of the tongues 146 is parallel to the plane of the cross beam 112 contrary to the example shown in FIG. 17 where the tongues 146 are perpendicular to the plane of the cross beams.

Figure 20:
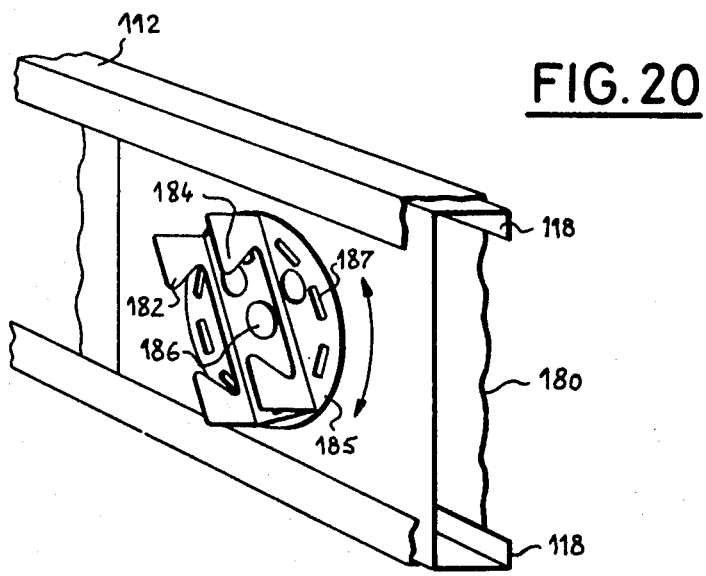
FIG. 20 is a perspective view of a rotatable support enabling assembly of a transversal element at a determined angle on a longitudinal up-right.

On FIG. 20 there is seen a support 180 enabling to place a cross beam 112 at a given angle with respect to its upright. For this purpose two tongues 182 and 184 are mounted on a slide in the form of disc 185 capable of turning about a pivot 186 fixed to the support 180. Stud holes 187 provided on the peripheral part of the disc 185 co-operate by racheting with one or several protuberances provided on the face of the support 180 so as to enable the positioning at a desired angle of the slide with respect to support 180. The two tongues 182 and 184 embrace an upright and are hooked on the embossments of this upright in a manner which does not require to be explained in detail.

Figure 10:
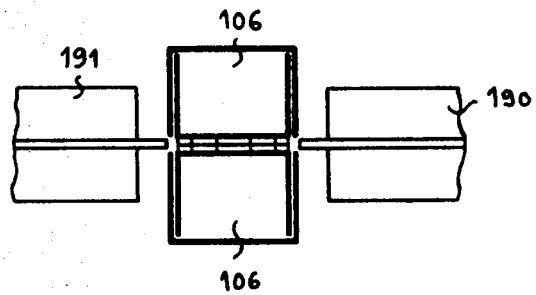
FIG. 10 is a planned view showing the assembly of two transversal elements engaging in the interstices provided between two back-to-back sections of an up-right.
Figure 11:
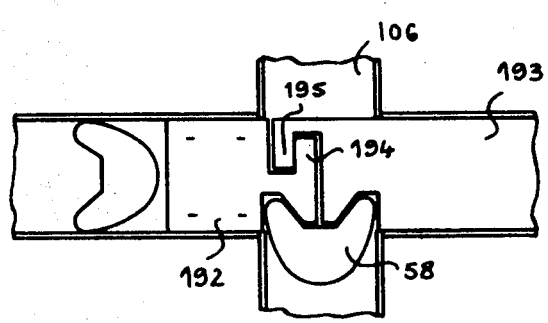
FIG. 11 is an elevational view of the device of FIG. 10 shown in assembly position.

FIGS. 10 and 11 show a variant in which the cross beams 190 and 191 are constituted as the upright 106, from two U-shaped sections disposed back to-back and covered with a sheath also U-shaped. Tongues in the form of plates 192 and 103 are welded in the interstices separating the twinned sections of the cross beams 191 and 190 and the extremities of these tongues have hooks 194 and 195 respectively which extend beyond the extremities of the cross beams to hook one on the other precisely in the interstices separating the back-to-back interstices from the uprights 106. The immobilisation of the hooks on the uprights has been provided by giving to the extremities of the tongues 192, 193 an inclined shape espousing the ramps of the embossments 58 of the uprights. On FIG. 11 only the rear part of the cross beams and the twinned uprights have been shown for reasons of clarity.

FIG. 18 shows a partition according to the invention which can for example serve as a false ceiling. Longitudinal elements of the partition are constituted by main girders composed on a U-shaped section 198 at the interior of which penetrates a smaller U-shaped section 200. Between the wings of the sections 198 and 200 are driven the edges 202 bent over at right angles of the panel 204 forming the larger part of the plane face of the partition. These faces are prolonged at the place of the assembly of the panels by the back of the section 200 and this back can have the same aesthetic aspect or a different aesthetic aspect as that of the panels 204. Usefully, all of the parts are metallic and the exterior surfaces of the panels 204 and the sections 200 can be provided with a layer in plastic material which equally increases the adhesion between the sections 200 and the small wings 202. The girders 198, 200 can constitute a true grid of the partition and in this case one of the girders must clearly be interrupted at the place of crossing with the perpendicular girders.

It is clear that it is possible to make numerous modifications to the above described examples without departing from the framework of the invention as defined in the following claims; notably it is possible to provide covers in plastic material for covering the openings or passages in the structure according to the invention: it is notably possible to provide covers for covering the interstics between parallel cross beams of the piece of furniture shown in FIGS. 1 and 2. Preferably these covers are placed slightly behind the free extremities of the cross beams as has been shown in the left hand part of FIG. 2, to enable an eventual extension of the piece of furniture by the insertion of a complementary upright in the cavities thus created. It is also possible to provide cross beams 217 perpendicular to the cross beams 112 and the extremity of these cross beams 217 can for example be provided at 219 in a manner to be able to embrace a support fixed to the upright or can be embraced by this support.

What is claimed is:

1. A structure of standardized elements comprising a framework of parallel longitudinal elements and a plurality of transverse elements interconnected between said longitudinal elements, each longitudinal element comprising at least two sections having lognitudinally extending hollow portions and longitudinally open faces in communication with said hollow portions, one of said two sections in each element being interfittingly received within the other section with said open faces directed oppositely, means for each said element for resiliently gripping said two sections together, thereby defining a generally prismatic longitudinally enclosed enclosure, and means for exerting a gripping force between said transverse elements and said interfitting sections of said longitudinal elements.

2. A structure according to claim 1, wherein the two sections of each longitudinal element have a substantially U-shaped transversal cross-section.

3. A structure according to claim 1, further comprising means on an exterior surface of one of the said sections of each longitudinal element for increasing the adhesion of said exterior surface to increase said gripping force between said transversal elements and said longitudinal elements.

4. A structure according to claim 3, wherein said means on said exterior surface comprises a plastics material.

5. A structure according to claim 1, wherein said transverse elements are panels each comprising a planar sheet having its edges bent at right angles, said edges being engaged by said means for exerting a gripping force.

6. A structure according to claim 1, wherein each section of each longitudinal element has a U-shaped transverse cross-section, and further comprising means including spacing members for interconnecting two of said elements in a closely adjacent relationship, said spacing members being connected to one said U-shaped section of each of said two elements.

7. A structure according to claim 6, wherein each U-shaped section has a web and two flanges extending from said web to define said U-shape, and wherein the said spacing members are projections provided on said web of at least one of the said sections.

8. A structure according to claim 7, wherein the said projections are V-shaped.

9. A structure according to claim 2, wherein said means for exerting a gripping force comprises means for gripping said interfitting sections to prevent separation of said interfitting sections.

10. A structure according to claim 9, comprising gripping riders and grippers tangentially covering the said gripping riders and a portion of a web portion of one of said U-shaped sections.

11. A structure according to claim 2, further comprising a first plate, and wherein a web portion of one of the said U-shaped sections of a plurality of said longitudinal elements is secured on said first plate.

12. A structure according to claim 11, further comprising a second plate joined to said first plate at an angle therewith, and having a plurality of said elements connected thereto.

13. A structure according to claim 11, further comprising means including struts for joining a plurality of said elements to form an assembly having an exterior surface having a crenelled cross-section.

14. A structure according to claim 1, wherein each longitudinal element comprises more than two U-shaped sections each having a web and two flanges, said sections having different widths and interpenetrating flanges.

15. A structure according to claim 1, further comprising reinforcing means including solid fluidtight material disposed within said enclosure.

16. A structure according to claim 13, further comprising ornamental means disposed in a plurality of crenel spaces of said crenelled section.

17. A structure according to claim 9, wherein the said means for gripping said interfitting sections comprises gripper riders having hook means, and said elements have bosses for engaging said hook means.

18. A structure according to claim 9, wherein each said means for gripping said interfitting section is subdivided into two hooking parts for reception on a longitudinal element.

19. A structure according to claim 9, wherein each said transverse element has a generally flat form and the said means for gripping said interfitting sections comprises clips means for maintaining the transverse elements flat against the longitudinal elements.

20. A structure according to claim 18, wherein the said hooking parts hook on to each other in an assembled position of said structure.

21. A structure according to claim 18, further comprising protuberances on said longitudinal elements, wherein at least one of the said hooking parts hook on one of said protuberances of a said longitudinal element.

22. A structure according to claim 6, wherein the said framework has perforations and means for hooking said transverse elements to said perforations.

23. A structure according to claim 9, wherein the said means for gripping said interfitting sections comprise rider means rotatably mounted on the said transverse elements for securing the transverse elements at predetermined angles on the longitudinal elements.

References Cited

UNITED STATES PATENTS

| | | | |
|---|---|---|---|
| 2,032,469 | 3/1936 | Charles | 52—721X |
| 3,152,670 | 10/1964 | Selkregg | 211—176X |
| 3,304,683 | 2/1967 | Ferreira | 52—721X |
| 3,332,197 | 7/1967 | Hinkle | 52—731 |
| 3,376,980 | 4/1968 | Serra | 211—176X |
| 3,388,809 | 6/1968 | Irish | 211—176 |
| 3,420,032 | 1/1969 | Felt | 52—731 |
| 3,494,480 | 2/1970 | Cassel | 211—176 |

FOREIGN PATENTS

| | | | |
|---|---|---|---|
| 1,021,611 | 3/1966 | Great Britain | 211—176 |

NILE C. BYERS, JR., Primary Examiner